Oct. 6, 1970  W. C. VAUGHN  3,531,900
MEANS FOR PROTECTING UTILITY POLES AGAINST WOODPECKERS
Filed Sept. 5, 1968
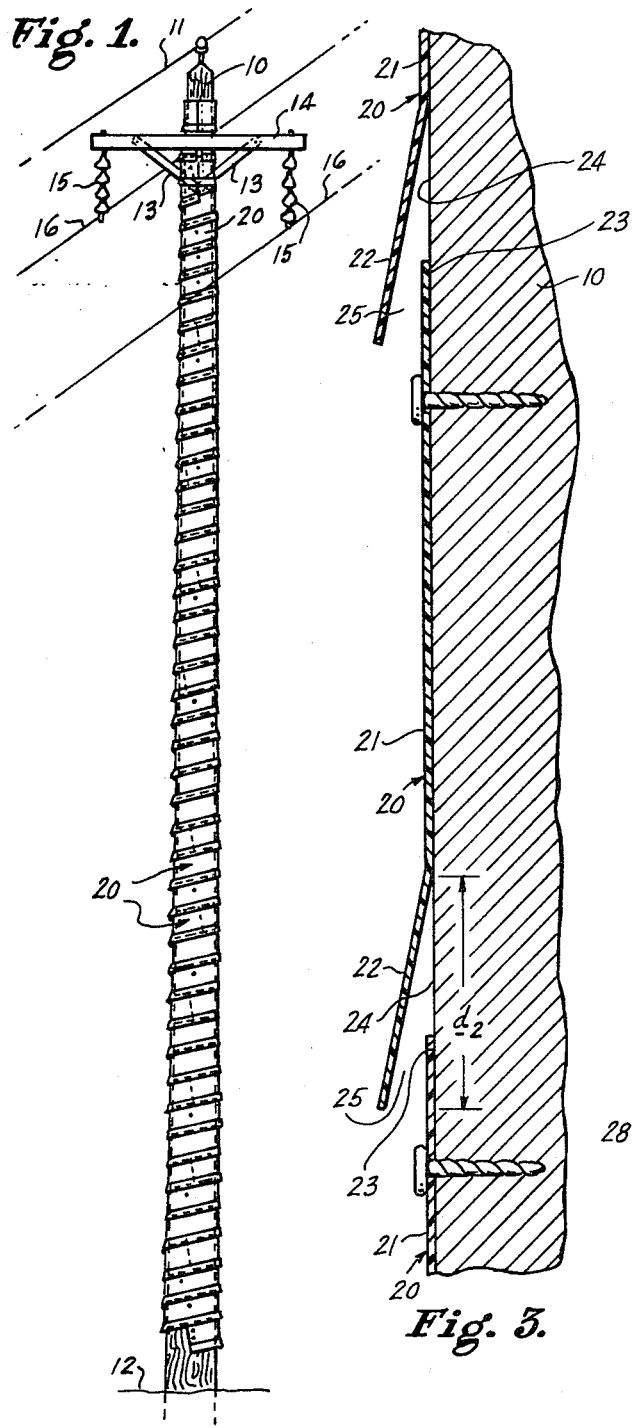
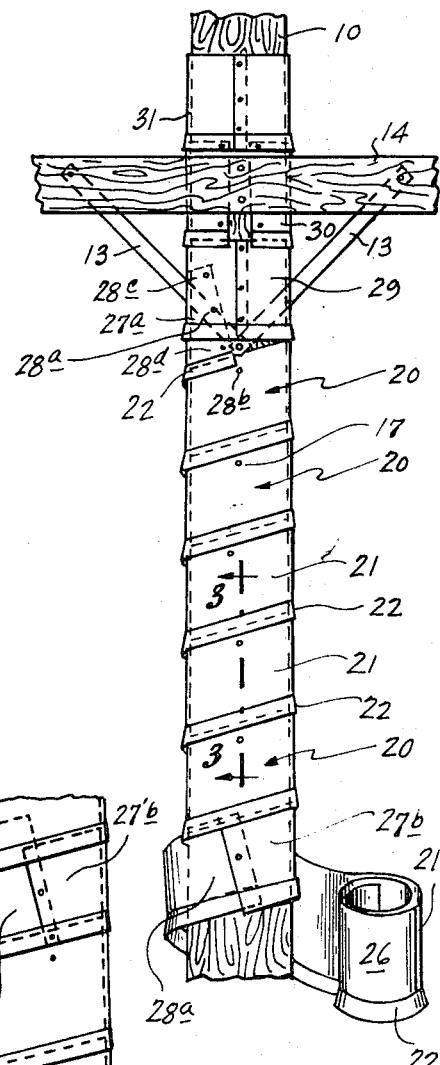
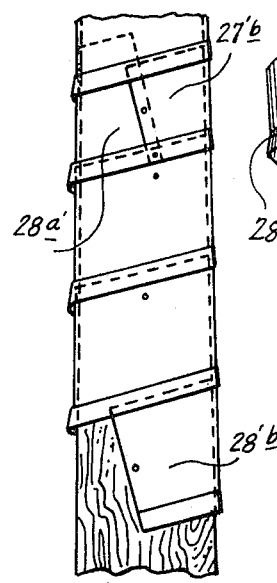
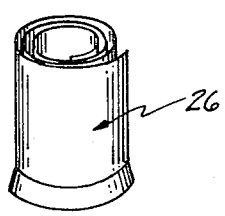
INVENTOR.
WILBUR C. VAUGHN
BY
Albert C. Johnston
ATTORNEY.

United States Patent Office 3,531,900
Patented Oct. 6, 1970

3,531,900
MEANS FOR PROTECTING UTILITY POLES AGAINST WOODPECKERS
Wilbur C. Vaughn, 353 Market St., Berwick, Pa. 18603
Continuation-in-part of application Ser. No. 662,002, Aug. 21, 1967. This application Sept. 5, 1968, Ser. No. 757,699.
Int. Cl. A01r *13/00;* E04b *1/72;* E04h *9/16*
U.S. Cl. 52—101        9 Claims

ABSTRACT OF THE DISCLOSURE

Wooden utility poles are protected against the pileated woodpecker by means of winds of a claw-impervious sheet material, for example, high density polyethylene strips, which overlap from the top down to deny any secure footing to the woodpecker and which have outwardly flaring lower edge portions to permit the pole to aerate through the radial gap that results between the flaring lower edge portion of each wind and the underlapped upper edge portion of the next lower wind.

---

This invention relates to a method and means for protecting wooden utility poles and similar upright wooden members against being damaged by woodpeckers. This application is a continuation in part of my copending U.S. application Ser. No. 662,002, filed Aug. 21, 1967 and now abandoned.

Woodpeckers of the pileated and ivory-billed species cause extensive damage to utility poles, reportedly amounting to millions of dollars annually, by digging out caverns and holes in the wood for nesting or roosting and escape from natural enemies. The extent of this damage has increased greatly with increased numbers of pileated woodpeckers which have come to habitate northern temperate regions since the enactment of laws protecting these as migratory birds.

There have been numerous efforts by utility companies, public institutions, and others, to find ways of preventing the damage. Tests have been reported which make use of creosote, repellant chemicals, moving objects such as red streamers, noisemakers, metal flashers, artificial owls, protective wire mesh, and various other covering devices placed on the poles where the woodpecker attacks most frequently. Yet all such efforts apparently have failed. A utility company concerned with the problem reported recently that despite "an ingenious array of devices to discourage the sabotage," the "pileated woodpecking 'flying carpenter' now has the upper hand and will continue as a nuisance until a chemical or some other method is developed to put the 'bite' on him."

I have discovered, and field tests of my invention have demonstrated, that the problem can be overcome, so that wooden utility poles and the like can be effectively protected against being damaged by the pileated and like species of woodpeckers, by applying about the surface of each pole to be protected, winds of a durable sheet material impervious to the claws of the pileated woodpecker, as by winding or wrapping strips of the material around the pole and fastening them in place, provided that these winds are overlapped from the top down and have outwardly flaring lower edge portions, which gap away from the underlapped upper edge portions of the next lower winds. The overlapping of the winds from the top down ensures that the upper edge of each wind, with the exception of the uppermost wind, is shielded by the flaring lower edge portion of the next higher wind, whereby to deny any footing to the woodpecker's claws at the upper edges of the winds. The gaps defined between the flaring lower edge portions of the winds and the underlapped upper edge portions of the next lower winds permit the protected pole to aerate or air dry therethrough. The outwardly flaring lower edge portions of the winds also facilitate their application to the pole in the described overlapping relation when, as is preferred, such winds are applied successively from the top down, for example, by helically winding one or more elongated strips of the protective sheet material about the pole starting at the top of the latter.

When the winds are applied by helically winding one or more elongated strips of the protective sheet material about the pole, the width of each such strip should not exceed the diameter of the pole at the area of the latter to be covered thereby and, if the pole is of tapered configuration, the length of each strip should be selected to permit maintenance of the extent of overlap of the successive turns or helical winds within desired limits.

The winds thus applied to a pole according to the invention constitute a means for durably and economically shielding the pole against damage by woodpeckers without obstructing or adversely affecting the funtions or the serviceability of the resulting pole structure.

The material employed for making the winds may be of any composition that can be brought economically to the required sheet-like form and wind dimensions and configuration with retention of the required imperviousness to woodpecker attack. It is provided advantageously in the form of flexible elongated strips of a tough weather-resistant dielectric plastic composition, such, for example, as a high density polyethylene or a similarly moldable, tough durable plastic composition. These strips are molded, extruded or otherwise formed with the required width and thickness, such as, a thickness of between 3 and 10 one-hundreths of an inch (.03–.10 inch), giving them imperviousness to attack by the woodpecker yet enabling them to be coiled and packaged for efficient transportation to the site of each pole to be protected, where they can be readily uncoiled, wound or wrapped about the pole in the required manner, and fastened in place to provide a shielded pole structure that will permanently foil attempted invasions by the woodpecker. After forming of the strips, one longitudinal edge portion thereof is shaped to define the required flaring edge portion which is longitudinally stretched to permit its coiling or winding with a greater diameter than the body portion of the strip.

The dielectric, or electrically non-conductive property of the plastic strip material enables winds of such material to be applied to poles of electric power lines without creating hazards of electrical shock. Moreover, such material can be economically impregnated with 2.5 to 5.0% carbon to prevent crystallizing of the plastic by ultra violet rays and further to afford a dark color presenting little contrast to that of a creosoted pole surface, and its composition can be selected, as is the case in the use of the polyethylene, so that it will not be decomposed by the creosote or other chemicals commonly used for the preservative treatment of wooden utility poles.

According to a further feature of the invention, each strip after being formed with the required flaring edge portion along one side, and while still hot, is coiled and allowed to set in the coiled form for ease in handling of the strip during its application to a pole.

The above mentioned and other features and advantages of the invention will be further evident from the following description and from the accompanying drawing of an illusrative embodiment thereof. In the drawing:

FIG. 1 is a schematic elevational view of a wooden pole for electric power lines, protected against woodpecker attack according to the invention;

FIG. 2 is an enlarged schematic elevational view of a portion of such a pole illustrating the manner in which the protective sheet material is applied thereto;

FIG. 3 is an enlarged, detail sectional view taken along the line 3—3 on FIG. 2;

FIG. 4 is an enlarged schematic elevational view of a portion of the pole showing the manner in which successive strips of protective material having different widths are applied thereto; and FIG. 5 is a perspective view of a coil of strip material according to this invention for use in protecting a wooden utility pole.

Referring to the drawing, there is illustrated in FIG. 1 a wooden pole 10 of the form commonly used for electric power lines, which carries a ground wire 11 at its top and has a length of about 60 feet, more or less, over the region from the ground surface 12 to the braces 13 of the crossarm 14 which supports the attachments and insulators 15 of live power lines 16. It is in this long thick region of the pole, which commonly tapers in diameter from about 20 inches at the ground surface to about 10 inches at the cross-arm braces, that the wood is most likely to be attacked and damaged beyond repair by the pileated and like species of woodpeckers.

According to the present invention, such attack and attendant damage to the pole are prevented by means of many winds 20 of a suitably durable sheet material that is not penetrable by the claws of the woodpecker, and which are wrapped or wound about the surface of the pole 10 throughout the region thereof that is prone to woodpecker attack. Each of the winds 20 is shown to include a body portion 21 having a straight line as its generatrix so as to lie close against the surface of pole 10 and an outwardly flaring lower edge portion 22 that overlaps the upper edge portion 23 of the next lower wind 20 (FIG. 3). Thus, the successive winds 20 are in overlapping relation from the top down, and the extent of the overlap $d$, is made smaller than the width $d_2$ of the flaring lower edge portion 22 of each wind. The foregoing ensures that the upper edge 23 of each wind underlapping the flaring edge portion 22 of the next higher wind will be spaced downwardly from the body 21 of such next higher wind to expose therebetween a surface area 24 of pole 10 at which the pole can aerate or air dry through the radial gap 25 defined between lower edge portion 22 and the upper edge portion 23 which is lapped thereunder.

The extent of the overlap $d_1$ is preferably at least ½ inch so that the overlapping flaring edge portion 22 will effectievly deny any footing to the woodpecker's claws at the underlapped upper edge 23 of the next lower wind. Further, to ensure effective air drying of the pole, the surface area 24 thereof preferably has a width of at least ¼ inch. Thus, in an example of this invention where the flaring lower edge portion 22 of each wind has a width $d_2$ of 2 inches, the successive winds 20 may be applied to the pole with the overlap $d_1$ thereof varying in the range from 1¾ inches to ½ inch.

In the embodiment shown, the winds 20 are applied by winding elongated flexible strips of the required material helically about the pole and fastening them thereto in end under end relation, thus providing upon the pole a continuous series of helical convolutions which are successively overlapped from the top down to the extent required.

The sheet material forming the winds 20 is advantageously composed of a high density polyethylene, preferably impregnated with 2.5 to 5.0% carbon, or other suitably tough weather-resistant dielectric plastic composition in the form of flexible elongated strips having a thickness providing the required toughness and durability. The thickness of the strips ordinarily will be in the range of .03 to .10 inch. For example, a thickness of about .04 inch has been found quite suitable in the use of strips of high density polyethylene.

Where, as in the embodiment shown, the winds 20 are applied by winding elongated flexible strips of the required material helically about the pole, the widths of such strips should not exceed the diameter of the pole at the regions of the latter about which the strips are to be wound. Thus, in the case of a pole tapering from a diameter of 20 inches at the ground to a diameter of 10 inches at the cross-arm braces, groups of strips of different widths, for example, some roughly 10½ inches width and some roughly 14 inches width, in the range between 8 and 18 inches, are applied to appropriate portions of the pole having diameters at least as large as the widths of the respective strips.

When the pole is of tapering configuration, for example as described above, the width of the exposed areas 24 of the pole surface provided between successive winds 20 formed by a single helically wound strip vary and, in order to maintain such width in the desired range of ¼ inch to 1½ inch for the case of a flaring edge portion 22 having a width $d_2$ of 2 inches, the length of each strip may be limited so that it will form only a few convolutions on the pole.

Accordingly, for shielding the long vulnerable region of a utility pole by means of winds in the form of helical convolutions which are overlapped as described, a collection of elongated strips of the sheet material is provided such that the length of each strip will not exceed, for example, about 8 to 16 feet, while the aggregate length of all the strips wound individually and fastened end under end upon the pole will form properly overlapped winds extending over the full length of the region to be protected. Such a collection consisting of twelve strips, each of about 16 feet in length and rolled into a coil 26 as shown schematically on FIG. 5, may be packaged in a container for transportation to the site of a pole to be protected according to the invention.

Preferably, according to this invention, each strip of suitable plastic extruded, molded or otherwise formed so as to have the requisite width, thickness and length and after having the required flaring edge portion 22 formed thereon, is wound or coiled into the form of the coil 26 while still hot and is held in such coiled form while the plastic material sets, with the diameter of the convolutions of the coil 26 being approximately equal to the diameter of the pole to be protected by the coiled strip. Thus, when the coiled strip is being applied to a pole, as hereinafter described in detail, it will tend to coil about the pole for facilitating the application procedure.

When forming the flaring edge portion 22 on each strip, as by passing the same between suitable forming rollers, the edge of portion 22 is longitudinally stretched to permit the coiling or winding of flaring edge portion 22 with a greater diameter than the corresponding body portion 21.

The elongated strips of the coils 26 can be wound spirally upon and fastened to a pole one after another, conveniently by starting near the top of the pole and working downward. A lineman on the pole may place the end 27a of the first of these strips next to the braces 13 and attach it by a nail 28a, preferably an aluminum shingle nail, driven through its center adjacent the end edge so that the strip can swivel about this nail. The strip then is wound tautly into a full convolution having its upper edge lapped under the flaring lower edge portion 22 of the attached end by about 1½ inches, and this convolution is fastened in place, as by a nail 28b, whereupon the starting end 27a is anchored in position as by driving additional nails 28c, 28d, etc. through it into the pole. Then the winding is continued to form additional convolutions 20, each preferably nailed or otherwise fastened in place, until the strip runs out and is fastened at its lower end 27b.

The strip thus wound downward upon the tapered pole surface forms several convolutions which are overlapped from the top down by a progressively decreasing distance $d_1$ which is about 1½ inches at the upper end 27a of the strip and limited to a vertical height of about ½ inch at the lower end 27b of the strip. The winding of the next strip then is started by centrally nailing its starting end 28a in underlapped but upwardly displaced relation to the end 27b, so that the upper edge of end 28a will underlap the flaring lower edge portion 22 of the wind directly above it by a distance of about 1½ inches. The further winding and fastening of the second strip and of succeeding strips are then continued in the manner described with respect to the first strip, until shielding winds have been applied over the entire pole surface being treated. If desired, a suitably formed piece 29 of the sheet material may be placed and fastened on the pole over any considerable surface area left exposed at the end of a series of helically wound convolutions.

Where, as shown on FIG. 4, the succeeding strips to be applied to a tapered pole are of relatively increased widths, the starting end 28'a of a relatively wide strip, for example, having a width of 14 inches, is lapped under the lower end 27'b of the preceding strip of smaller width, for example, a width of 10½ inches, so that the lower flaring edge 22 of end 28'a is aligned with the lower flaring edge of end 27'b. After end 27'b and the underlapped end 28'a are nailed at the center of the latter to pole 10, the relatively wide strip is wound tautly about the pole to provide, in its first convolution, a 1½ inch underlap of the upper edge of the wide strip past the lower edge of the end 27'b of the relatively narrower strip, and, thereafter, the further winding and fastening of the relatively wide strip are continued as described above to progressively reduce the extent of the underlap to a distance of ½ inch at the lower end 28'b.

Although utility poles seldom are damaged by woodpecker attack at the top portion of a pole at and above the crossarm braces, this portion may also be shielded, if desired, by applying a few winds of the described nature and overlapping relation over its surface. Such winds conveniently are formed by wrapping shorter individual strips of the impervious sheet material about the pole and fastening them in encircling relation thereto, for example, by forming a strip into a band 30 which encircles the pole and is overlapped by a band 31 thereabove and in overlapping relation to the piece 29 therebelow.

The shielding winds formed by helically winding elongated strips into a continuous series of convolutions extending over the long vulnerable region of the pole present an advantage in that a relatively small member of such strips need to be handled in applying the winds to the pole. It is quite practicable in many cases, however, to form most or all of the required winds on this region of the pole by wrapping a large number of shorter strips into the form of individual encircling bands such as those illustrated at 30.

In any case, it will be apparent that the winds 20, 29, 30 and 31 of a material that cannot be penetrated by the woodpecker's claws deny to the woodpecker any foothold on the areas of the pole covered by the winds. Further, by overlapping the winds from the top down, that is, by lapping the upper edge of each wind under the flaring lower edge portion of the wind thereabove, the woodpecker's claws cannot grasp the upper edges of the winds. Similarly, the lapping of the starting end of each strip under the lower end of the preceding strip, as at 28a and 27b on FIG. 2, ensures that the exposed edge of end 27b will incline downwardly to deny a foothold thereon. Such denial of a foothold for the woodpecker's claws makes it impossible for the bird to peck through the protective material of the winds which may be of a lesser thickness, and thus more economical, than would be required to be impervious to the woodpecker's beak if the woodpecker could find an adequate foothold on the pole.

The outwardly flaring lower edge portions 22 of the winds make it possible for the pole to air dry through the gaps 25 defined thereby, and further facilitate the lapping of the upper edge of each wind under the lower edge portion of the next higher wind, particularly when the winds are applied successively from the top down so as not to be punctured by the spikes of the lineman installing the protective covering or shielding. Since bucket trucks are increasingly used to inspect high line utility poles, the integrity of the protective or shielding material need not be disturbed after the application of the winds thereof. However, where poles are inspected by climbing the same, such inspections are only conducted at five-year intervals and, at such times, the plastic material of the winds is easily penetrable by the lineman's spikes which can also shear off the aluminum nails securing the winds to the pole to permit the safe climbing of the pole.

Thus, the winds of a claw-impervious material applied to a pole according to this invention durably and economically shield the pole against damage by woodpeckers without obstructing or adversely affecting the normal functions and serviceability of the resulting pole structure.

It will be evident to persons skilled in the art that the teachings of the present invention may be carried out in various ways other than those hereinabove described or illustrated in the drawing without departing from the substance of the invention, which is intended to be defined by the appended claims.

What is claimed is:

1. A wooden utility pole or the like having means thereon for shielding it against damage by woodpeckers, said shielding means comprising winds of a sheet material of sufficient toughness and thickness to be impervious to the claws of any pileated woodpecker, said winds being fastened about the surface of the pole in overlapping relation from the top down to deny to the woodpecker any foothold on the upper edge of each wind overlapped by the lower edge portion of the wind thereabove, and said lower edge portion of each wind being spaced radially outward from the upper edge portion of the next lower wind which is overlapped thereby, with the vertical extent of the radially outward spacing of said lower edge portion being greater than the extent of the lapping of the latter over the upper edge portion of the next lower wind, whereby to expose a surface area of the pole above the upper edge of each wind to the atmosphere by way of said radial spacing for air drying of the pole.

2. A pole structure according to claim 1, in which each of said winds includes a body portion having a straight line as its generatrix to lie close against the pole surface, and said lower edge portion of each wind flares outwardly from the lower edge of said body portion at a substantially constant angle to and along said body portion and is elongated relative thereto so as naturally to flare outwardly from the plane of said body portion when the same is coiled or is wound about the pole.

3. A pole structure according to claim 2, in which said winds are constituted by flexible strips of a high density polyethylene impregnated with 2.5 to 3% carbon and having a thickness of from .03 to .10 inch and a width of between 8 and 18 inches.

4. A pole structure according to claim 2, in which said extent of the lapping of the lower edge portion of each wind over the upper edge portion of the next lower wind is at least ½ inch, and said surface area of the pole exposed above the upper edge of each wind has a vertical width of at least ¼ inch.

5. A pole structure according to claim 2, in which at least some of said winds are constituted by elongated flexible strips of a tough weather-resistant dielectric plastic composition wound helically about the pole, starting at the top of the portion of the pole to be protected thereby, and fastened to the pole in end-under-end relation, said strips forming a continuous series of helical convolutions which overlap from the top down.

6. A pole structure according to claim 5, in which each of said strips has a width smaller than the diameter of the pole at the portion of the latter on which the respective strip is wound.

7. A pole structure according to claim 6, in which the pole is tapered, and each of said strips has a length, in relation to the degree of taper of the pole and the width of the outwardly flaring lower edge portion, to permit a minimum overlap of ½ inch at the lower end of the respective strip for a minimum ¼ inch width of the exposed area of the pole at the starting end of said respective strip.

8. A pole structure according to claim 2, in which at least some of said winds are constituted by individual flexible strips of a tough weather-resistant dielectric plastic composition wrapped about and fastened to the pole in encircling relation thereto.

9. Material for shielding a wooden utility pole or the like against damage by woodpeckers, comprising an elongated flexible strip of a weather-resistant dielectric plastic composition, of sufficient toughness and thickness to be impervious to the claws of any pileated woodpecker, said strip including an imperforate body portion having a straight line as its generatrix and including a lower edge portion which extends along the lower edge of said body portion at an angle thereto and is elongated relative to said body portion so as naturally to flare outwardly from the plane of said body portion when the strip is coiled or is wound about said pole, said strip having a length which is at least several times greater than the circumference of the pole to be shielded thereby, its width being between 8 and 18 inches and its thickness being between .03 and .10 inch, said strip being a molded body of a high density polyethylene impregnated with from 2.5% to 5.0% of carbon and thermally pre-set in coiled form.

References Cited
UNITED STATES PATENTS

| | | | |
|---|---|---|---|
| 2,047,958 | 7/1936 | Frees | 47—23 |
| 508,193 | 11/1893 | Tyra | 52—553 |
| 199,355 | 1/1878 | Daggett | 47—23 |
| 730,575 | 6/1903 | Schirra | 47—24 |
| 1,108,764 | 8/1914 | Kull | 47—24 |
| 2,928,143 | 3/1960 | Newton | 52—553 |
| 3,333,361 | 8/1967 | Manak | 47—23 |

OTHER REFERENCES

Reinhold Plastics Applications Series by Reinhold Publishing Corp., 1957; Manufacture of Polyethylene, page 74.

HENRY C. SUTHERLAND, Primary Examiner

U.S. Cl. X.R.

47—23; 52—309